May 23, 1967  M. W. ELWELL  3,321,071

WASHING MACHINE SERVICE UNIT

Filed Jan. 21, 1965  6 Sheets-Sheet 1

INVENTOR
MAURICE W. ELWELL
BY
Fedler Bradley & Patmende
Attys.

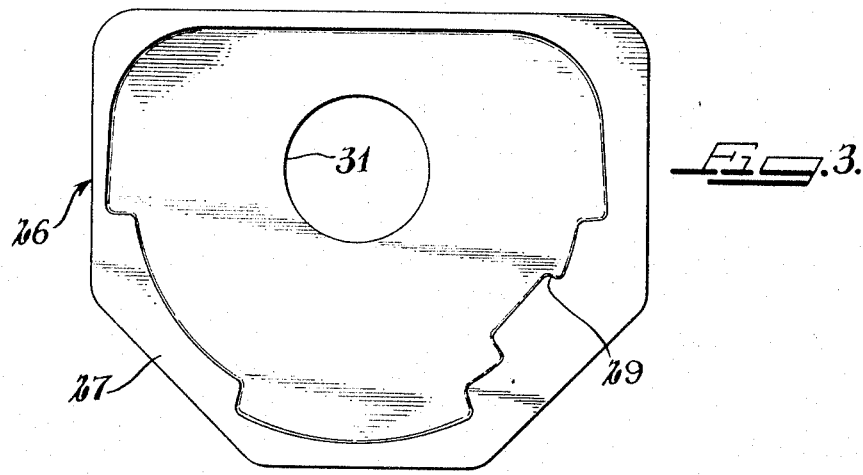
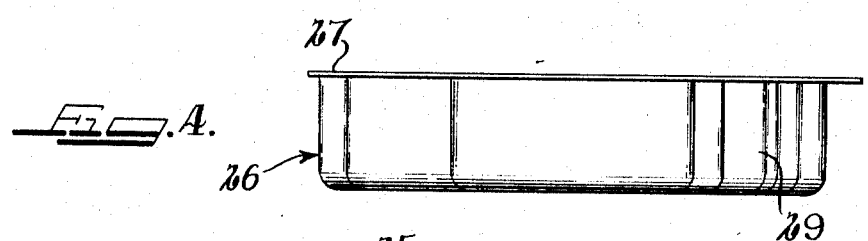
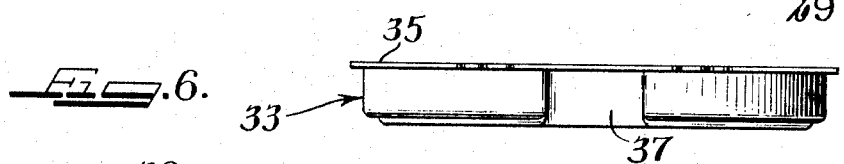
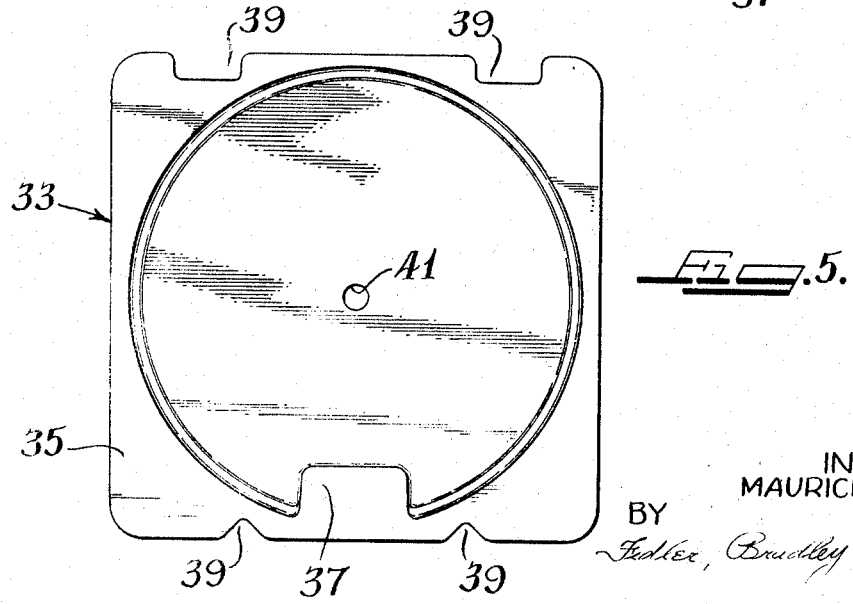

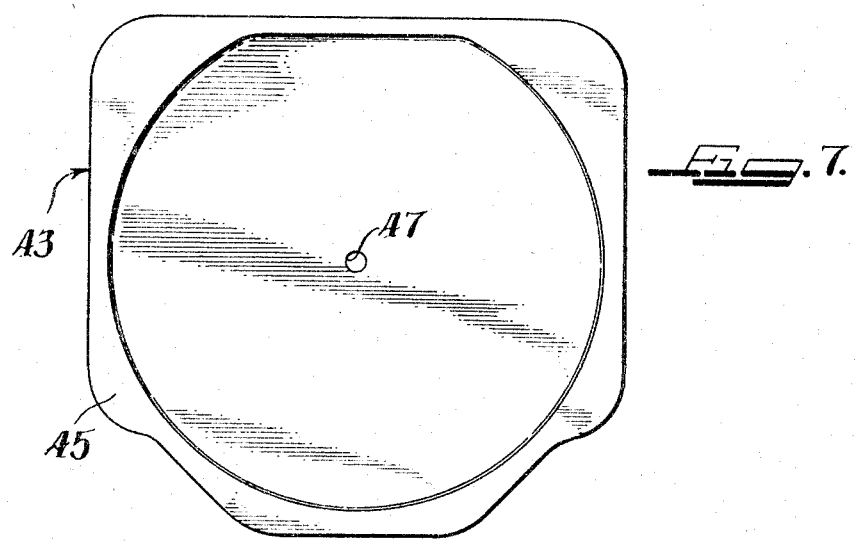
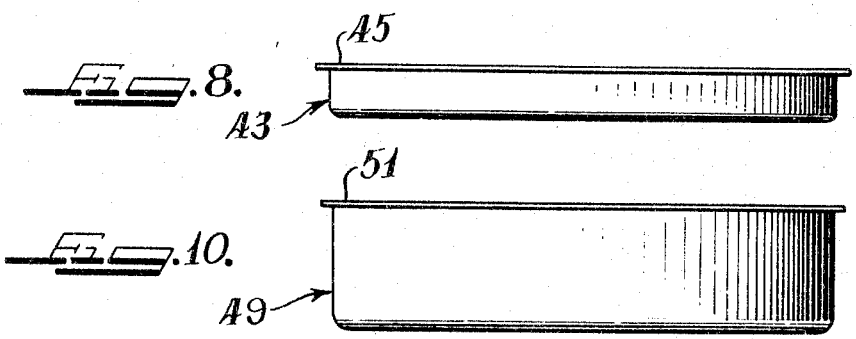
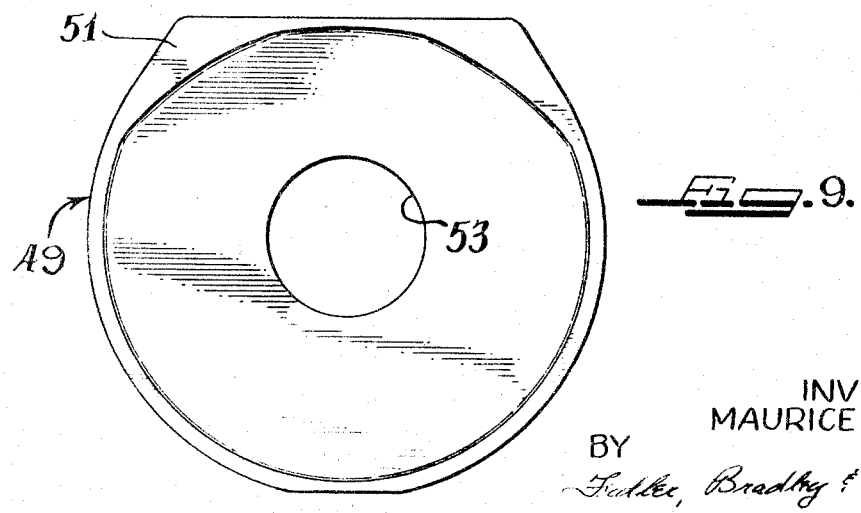

May 23, 1967  M. W. ELWELL  3,321,071
WASHING MACHINE SERVICE UNIT
Filed Jan. 21, 1965  6 Sheets-Sheet 4
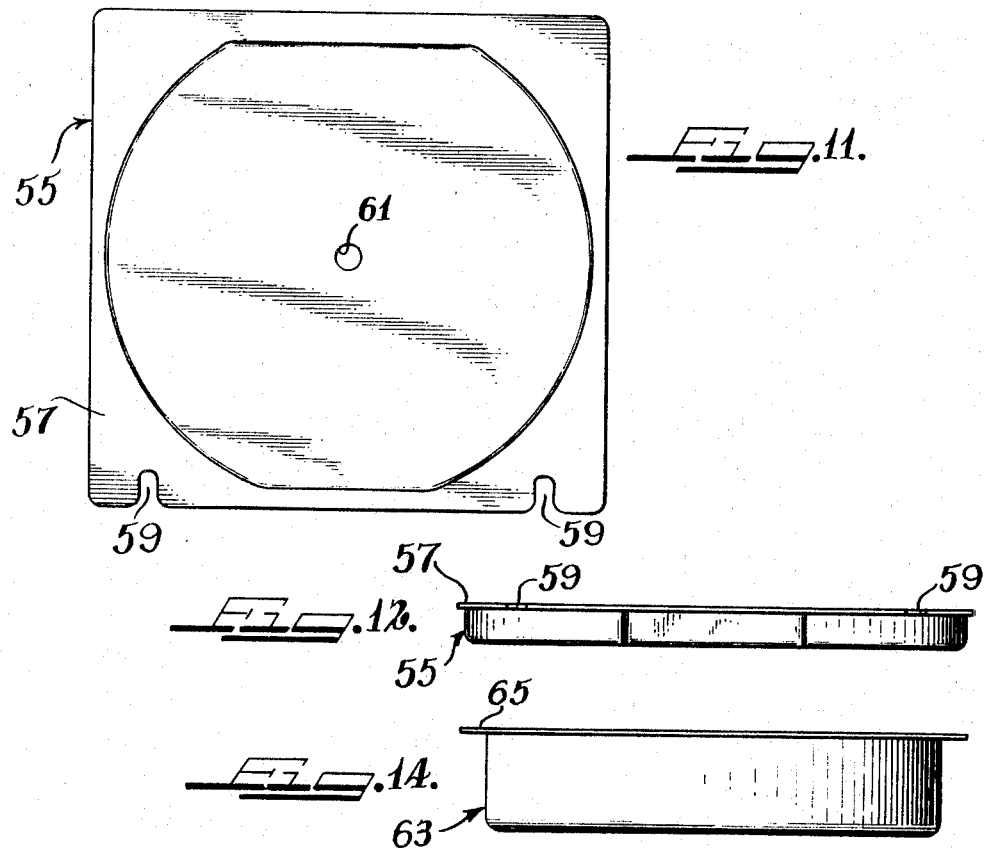
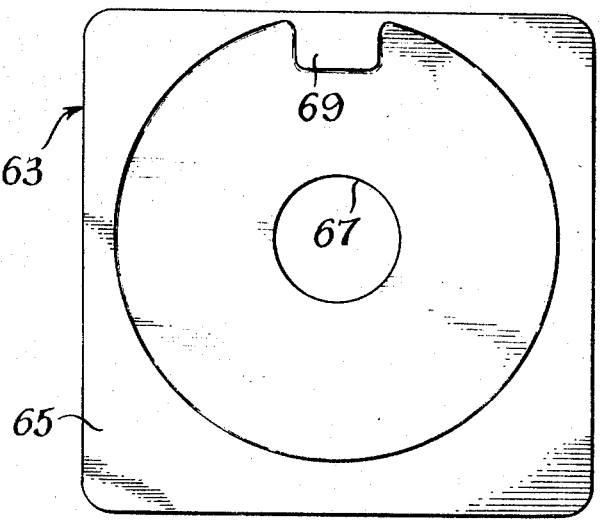
INVENTOR
MAURICE W. ELWELL
BY
Fidler, Bradley & Patnaude
Attys.

May 23, 1967  M. W. ELWELL  3,321,071
WASHING MACHINE SERVICE UNIT
Filed Jan. 21, 1965  6 Sheets-Sheet 5
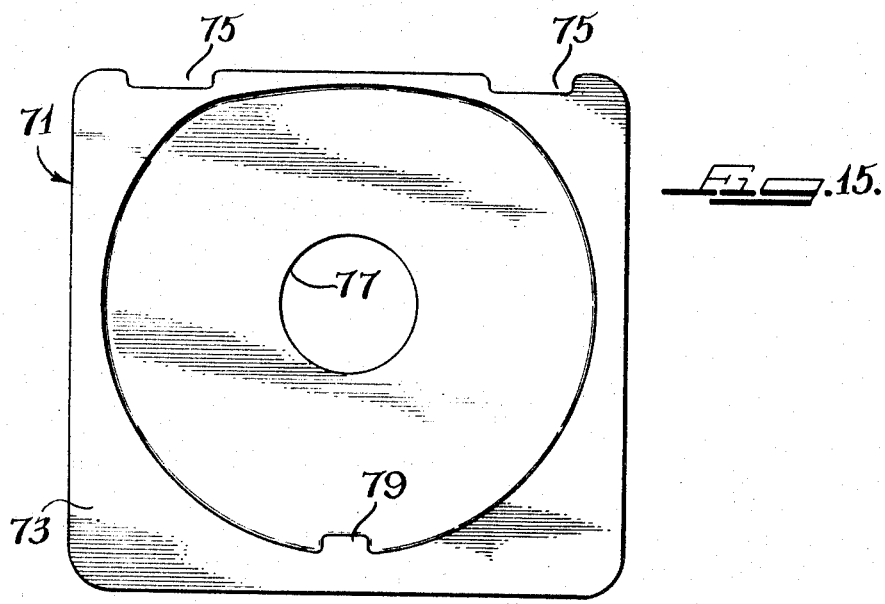
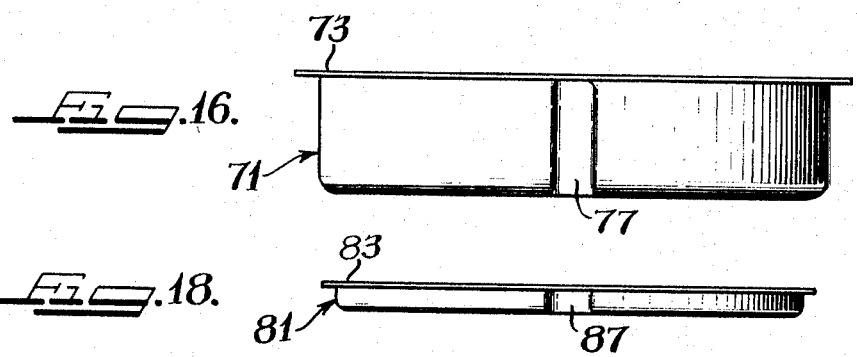
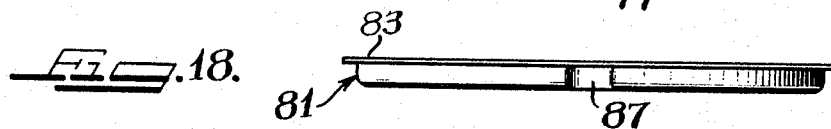
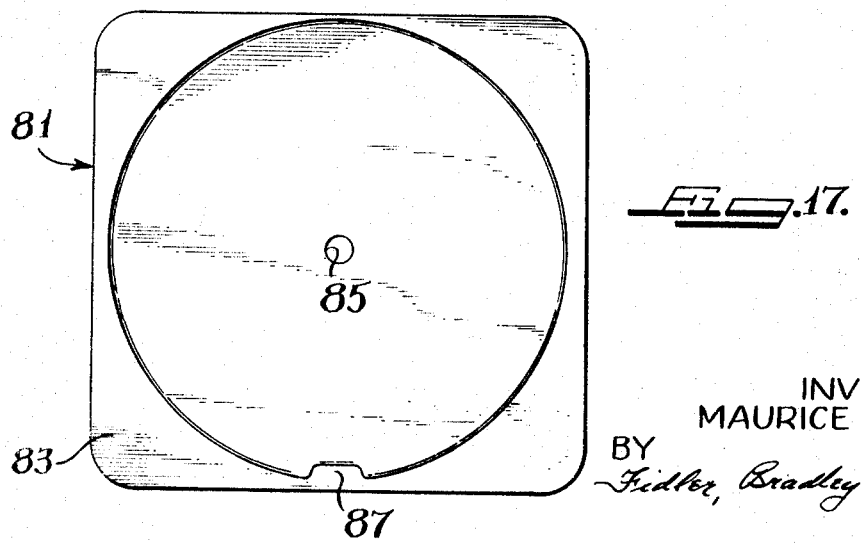
INVENTOR
MAURICE W. ELWELL May 23, 1967  M. W. ELWELL  3,321,071
WASHING MACHINE SERVICE UNIT
Filed Jan. 21, 1965  6 Sheets-Sheet 6
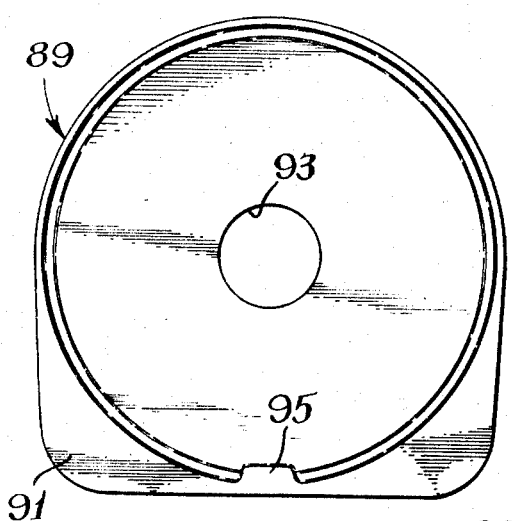
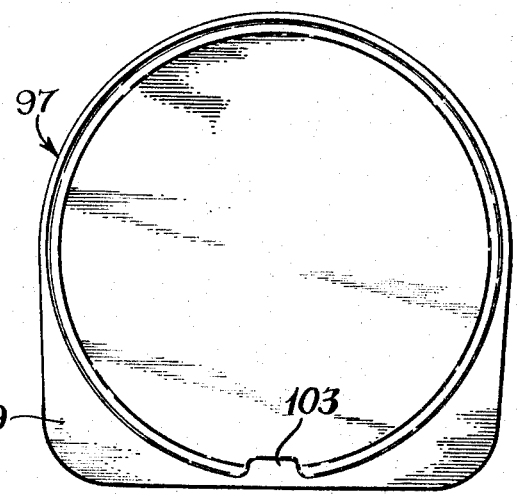
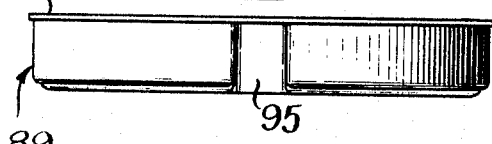
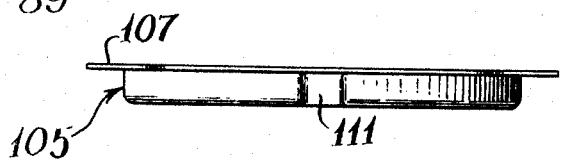
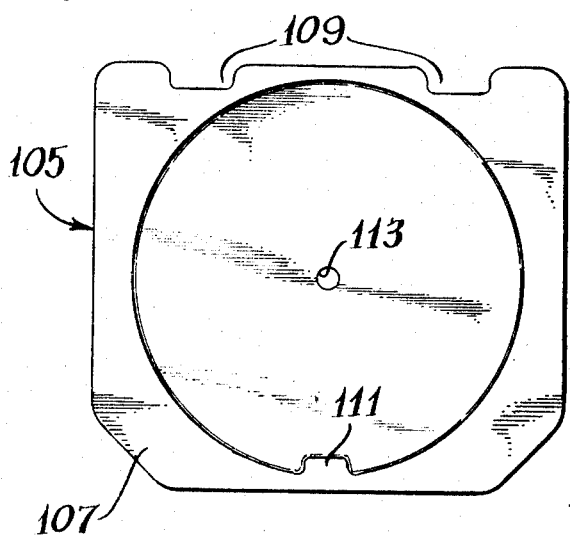
INVENTOR
MAURICE W. ELWELL
BY Fidler, Bradley & Patnaude
Attys.

United States Patent Office 3,321,071
Patented May 23, 1967

3,321,071
WASHING MACHINE SERVICE UNIT
Maurice W. Elwell, Hawthorne, Calif., assignor to Iden Manufacturing Co., Inc., Chicago, Ill., a corporation of Illinois
Filed Jan. 21, 1965, Ser. No. 426,874
4 Claims. (Cl. 206—46)

The present invention generally relates to units for servicing automatic washing machines for shipment, and more particularly, it relates to a compact, one-piece plastic service unit for inhibiting relative movement between the drum, agitator and housing of an automatic washing machine to thereby protect the machine from damage during shipment.

In an automatic washing machine, the drum and agitator are free to move with respect to the outer housing or cabinet of the machine and also with respect to each other, such movement being necessary in order to carry out a washing and spin drying cycle of the automatic washing machine. The drum of the washing machine is supported in the cabinet of the machine by means of resilient mountings which permit the drum to undergo vigorous movement without causing the cabinet of the machine to be excessively vibrated. Severe vibration can damage the timing mechanism and transmission of the machine, the most important working elements in an automatic washing machine.

When it becomes necessary to ship an automatic washing machine, such as when a family moves from one area of the country to another, the free mounting of the drum and agitator within the washing machine turns from a safeguard to a hazard which can cause serious damage to the transmission and other parts of the machine. In the course of a move, the starting and stopping of a truck can cause the massive drum and agitator to undergo extended excursions on the resilient mountings, damaging the mountings and more seriously causing damage to the transmission and to the electrical components of the machine.

It has, therefore, become the practice in the moving industry to service automatic washing machines before shipment so that the drum is secured to the outer shell or cabinet of the machine thereby preventing any movement thereof and any resulting damage. The prior art methods of servicing automatic washing machines require extended periods of time and skilled labor in opening the machine and bolting or strapping the drum to prevent its movement. Moreover, the servicing of the washing machine by prior art methods usually requires more than one person in order to provide the force necessary to move the drum relative to the outer housing of the machine for the insertion of bolts or straps.

In contrast to the bolts and straps which have been used in the prior art, the service unit of the present invention consists of a clean, one-piece plastic insert which is placed into the loading opening of the machine to prevent the drum and agitator of the machine from undergoing violent excursions during the course of a move.

The service units of the present invention are fabricated from a single sheet of high density plastic. Each unit is contoured to fit a specific machine taking into consideration the projections into the loading opening of the machine where it is designed to be inserted and also obstructions in the cover recess area where it is adapted to seat when in use.

The units can be simply and inexpensively manufactured through a cavity vacuum molding process. In this process, sheets of plastic having high tensile strength such as high density styrene are placed in the mold and subjected to heat and vacuum through which they are conformed to the outline of the mold. When the forming process is completed, the finished service unit is removed from the mold.

In view of the dished configuration of the service units, several units designed for a specific style washing machine can be closely packed for ease in packing and storage.

The finished washing machine service unit has a hard, non-porous, washable, dent resistant surface which insures a long lasting, neat appearance. The units are also water resistant, odor free and dimensionally stable, thereby permitting their use for extended periods of time in washing machines which have not been thoroughly drained before being shipped.

It is, therefore, an object of the present invention to provide a new and improved service unit for automatic washing machines.

It is another object of the present invention to provide a compact, one-piece, lightweight plastic service unit for automatic washing machines.

It is a further object of the present invention to provide a strong, non-denting, efficient, reusable service unit for automatic washers.

It is a still further object of the present invention to provide a service unit for automatic washing machines which can be inserted and removed with a minimum expenditure of time and labor on the part of the person carrying out the operation.

It is yet another object of the present invention to provide a durable plastic service unit which can protect the drum and agitator of an automatic washing machine from violent damaging excursions while still taking advantage of the resilient mounting of these parts.

The washing machine service unit of the present invention is discussed in more detail with reference to the accompanying drawings, in which:

FIG. 3 is a top plan view of a service unit for use with a Kenmore type washing machine;

FIG. 4 is an elevational view looking toward a side of the service unit as illustrated in FIG. 3;

FIG. 5 is a top plan view of a service unit for use with a Hotpoint type automatic washing machine;

FIG. 6 is an elevational view looking toward a side of the service unit as illustrated in FIG. 5;

FIG. 7 is a top plan view of a service unit for use with a late model General Electric type automatic washing machine;

FIG. 8 is an elevational view looking toward a side of the service unit as illustrated in FIG. 7;

FIG. 9 is a top plan view of the service unit for use with a Philco type automatic washing machine;

FIG. 10 is an elevational view looking toward a side of the service unit as illustrated in FIG. 9;

FIG. 11 is a top plan view of a service unit for use with a Norge type automatic washing machine;

FIG. 12 is an elevational view looking toward a side of the service unit as illustrated in FIG. 11;

FIG. 13 is a top plan view of a service unit for use with a Kelvinator type automatic washing machine;

FIG. 14 is an elevational view looking toward a side of the service unit as illustrated in FIG. 13;

FIG. 15 is a top plan view of a service unit for use with a Frigidaire type automatic washing machine;

FIG. 16 is an elevational view looking toward a side of the service unit as illustrated in FIG. 15;

FIG. 17 is a top plan view of a service unit for use with a Speed Queen type automatic washing machine;

FIG. 18 is an elevational view looking toward a side of the service unit as illustrated in FIG. 17;

FIG. 19 is a top plan view of a service unit for use with a Maytag type automatic washing machine;

FIG. 20 is a top plan view illustrating a service unit for use with a Maytag type automatic washing machine;

FIG. 21 is an elevational view looking toward a side of the service units as illustrated in FIGS. 19 and 20;

FIG. 22 is a top plan view of a service unit for use with an old style General Electric type automatic washing machine; and FIG. 23 is an elevational view looking toward the side of the service unit as illustrated in FIG. 22.

Figure 1:
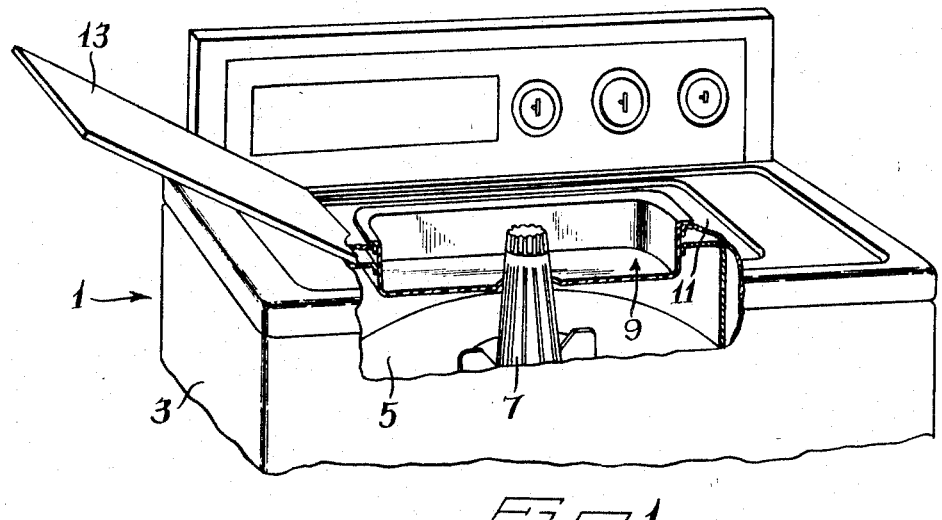
FIGURE 1 is a perspective view, partly in section, of an automatic washing machine having a service unit embodying the present invention mounted therein.

In FIG. 1, a conventional top loading automatic washing machine is indicated generally at 1. The washing machine has as its principal elements an outer housing or cabinet 3, a drum 5 mounted within the housing and a vertically disposed agitator 7 mounted in the drum. A service unit of the present invention is shown at 9 suspended in a recess 11 provided at the top of the cabinet 3 for receiving a pivotally mounted cover 13.

Figure 2:
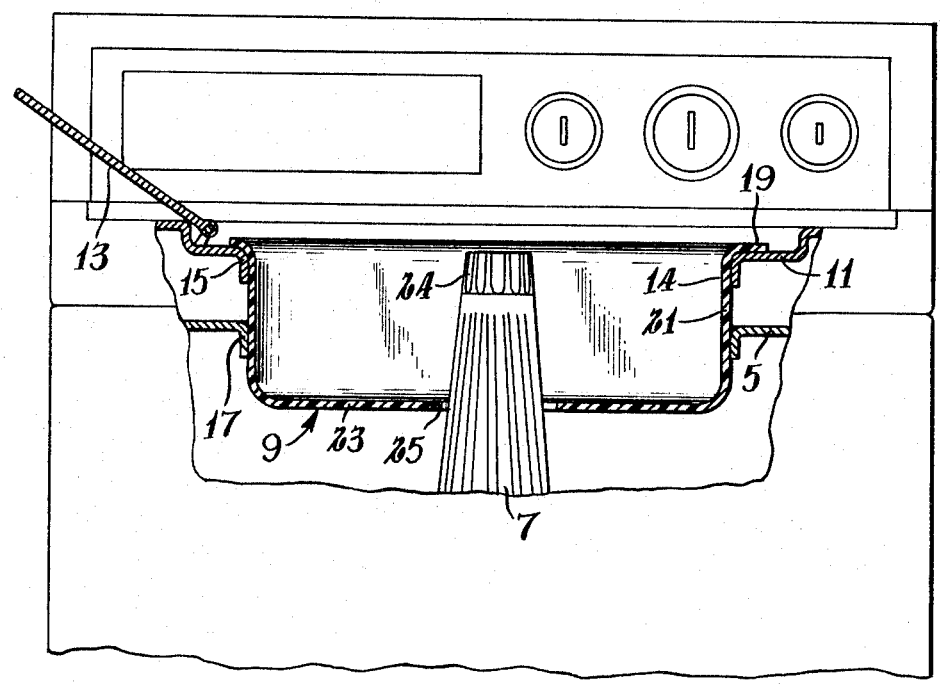
FIG. 2 is a front elevational view, partly broken away, of the machine and service unit illustrated in FIGURE 1.

A loading and unloading opening 14, shown in FIG. 2, is centrally located within the recess 11. The loading and unloading opening 14 is bounded by the down-turned edge 15 of the cover recess 11. The drum 5, within the housing 3, also has a downturned edge 17, disposed below and in alignment with the edge 15, which also determines the loading and unloading opening 14. The edges of those parts have been turned in order to strengthen the pieces and to provide smooth edges to prevent injury to the hands and to clothing during the loading and unloading operation.

A service unit of the present invention is shown at 9. The service unit is suspended from cover recess 11 into the loading and unloading opening 14 by means of flared edge 19. The flared edge 19 which forms the upper edge of the service unit is flattened out so that it hangs from cover recess 11 without preventing the closing of the pivotally mounted cover 13. In the course of shipment, the cover 13 can be closed over the service unit and taped down to prevent it from being damaged.

The side portions 21 of the service unit are adapted to fit snugly within the openings bounded by downturned edges 15 and 17. The service unit 9 thereby maintains edges 15 and 17 in alignment, locking the drum 5 of the automatic washing machine from movement relative to the outer housing 3.

Below outwardly flared edge 19 and within the area bounded by sides 21 is a flat portion 23, which forms the bottom of the service unit 9. The flat bottom portion 23 has an aperture 25 therein through which the vertically disposed agitator 7 loosely passes. The aperture 25 is larger than the outer dimension of the agitator and allows the service unit to pass freely over the agitator. The agitator has a threadedly mounted removable cap 24 thereon. The cap 24 serves to hold the agitator 7 in place and can be removed when it is desired to remove the agitator 7 for cleaning.

When the service unit 9 is in position, it does not fit tightly about the agitator or bias it downwardly which would place the resilient mountings under compression. The service unit is adapted to fit relatively closely about the agitator while still allowing the agitator to be protected by the resilient mountings. The resilient mountings protect the agitator from small vibrations while the service unit stops the agitator from undergoing long excursions on the resilient mountings where the momentum built up by the large mass in motion could cause severe damage to the transmission of the machine.

In the prior art servicing techniques, the entire automatic washing machine was united into a rigid single unit. Every vibration, no matter how slight, was transmitted through the entire machine. While the machines were protected from momentum surges during starts and stops, the continuous shipping vibration tended to cause loosening and damaging of the working elements within the machine.

In contrast, through the combined use of the resilient mountings within the machine and the washing machine service unit, the automatic washing machine is protected from both large and small vibration shocks. During the course of the move, the continuous relatively constant vibration caused by the motion of a truck is absorbed by the resilient mountings. The momentum surges caused by starts and stops are absorbed by the service unit. It can be seen, therefore, that the machine is well protected from damaging vibration.

FIGS. 3 and 4 show views of a service unit 26 designed for use with a Kenmore washing machine. The service unit has an outwardly turned flared edge 27 and contoured side portions 29. In the service unit for use with the Kenmore washing machine, the side must be contoured to fit about the water filter. The reference numeral 31 indicates the agitator aperture in the service unit.

FIGS. 5 and 6 show different views of an automatic washing machine service unit 33 designed for use with a Hotpoint type washing machine. The service unit 33 has a contoured flared edge 35 having cut-outs 39 therein. The cut-outs 39 permit the flared edge 35 to fit around projections in the cover recess of the machine. The side of the service unit 33 is contoured at 37 to fit around a projection in the loading opening of the machine.

In using the service unit illustrated in FIG. 5, the cap 24 (FIG. 2) is removed from the agitator 7. The service unit is then inserted into the loading opening of the machine with the uncapped portions of the agitator 7 passing through the aperture 41. The cap is then loosely replaced on the agitator 7.

FIGS. 7 and 8 show the top plan view of a side view, respectively, of a service unit for a late model General Electric type washing machine. The service unit indicated generally at 43 has a flared edge 45, and an agitator aperture 47. The service unit is designed to be used in the machine where the cap is easily removed and replaced on the agitator.

FIGS. 9 and 10 show different views of a service unit for use with a Philco type automatic washing machine. The service unit 49 has a top flared edge 51, and an agitator aperture 53.

FIGS. 11 and 12 show views of a service unit 55, designed for use with a Norge type automatic washing machine. The service unit 55 has a top flared edge 57, having cut-outs 59 therein. The service unit also has an agitator aperture 61 for use in holding an agitator with a removable cap.

FIGS. 13 and 14 show top plan and side views, respectively, of a service unit for use in a Kelvinator type automatic washing machine. Service unit 63 has a top flared edge 65 and an agitator aperture 67. The side of the service unit is contoured at 69 to fit around a projection in the loading opening of the washing machine.

FIGS. 15 and 16 show different views of a service unit designed for use with a Frigidaire type automatic washing machine. The service unit 71 has a top flared edge 73, having cut-outs 75 therein. The service unit has an agitator aperture 77 in a contoured side portion 79 for fitting about a projection into the loading opening of the machine.

FIGS. 17 and 18 show top plan and side views, respectively, of a service unit for use with a Speed Queen type automatic washing machine. The service unit 81 has a top flared edge 83 and an agitator aperture 85. The side portion of the service unit is contoured at 87 to fit about a projection in the loading opening of the machine.

FIGS. 19, 20 and 21 show different views of a service unit for use with a Maytag type automatic washing machine. The service unit 89 has a flared edge 91 and an agitator aperture 93. The side portion of the service unit is contoured at 95 to facilitate the manufacturing thereof.

The service unit 97 has a top flared edge 99 and a contoured side portion 103.

FIGS. 22 and 23 show a top plan view and side view, respectively, of a service unit for use with an older model General Electric type automatic washing machine. The service unit 105 has a flared edge 107 having cut-out portions 109.

The side portion of the service unit is contoured at 111 to fit about projections in the loading opening of the machine. The service unit 105 has a small agitator aperture 113 for use with the older General Electric type automatic washing machine which have a readily removable cap on the agitator.

The procedure for servicing an automatic washing machine with any of the service units illustrated in FIGURES 3 through 23 is very simple. The shipper merely disconnects the water hoses from the supply of hot and cold water and also disconnects them from the back of the machine. The hoses can then be placed in the drum of the machine for safe storage. The drain hose should also be disconnected and placed in the drum of the machine. The electric cord, if removable from the machine, can also be placed in the drum, or, if not removable, it can be coiled and taped to the back of the machine. It is also a good procedure to remove all small items, such as knobs and electrical grounding clips, and place them in a bag in the drum.

After all of the detachable external components have been removed from the machine and placed in the drum, the service unit should be inserted into the loading opening. If the machine is of the type with a readily removable cap on the agitator, the cap should be removed before inserting the service unit. After the service unit is in place, the cap should be replaced. If the agitator is not of the removable cap type, the service unit is merely slipped over the agitator into the loading opening. With either type of service unit, the drum and agitator are still free to undergo short movements on their resilient mountings.

After the service unit has been put in place the lid of the machine should be closed over it and sealed with masking tape or with a tape carrying an instruction that the automatic washing machine has been serviced by a service unit of the present invention. The machine is then ready for shipment.

While service units have been shown for specific washing machines, this is not to be taken as a limitation on the scope of the present invention. The service units of the present invention can easily be fabricated for any type of washing machine having resiliently mounted internal working components.

Those features of the invention which are believed to distinguish the novel aspects thereof are set out with particularity in the appended claims.

I claim:

1. In combination with an automatic washing machine including an outer housing, a drum resiliently mounted within said housing and movable relative to said housing, an agitator vertically disposed within said drum and movable relative to said drum and said housing, and a loading opening bounded by edges of said housing and said drum for providing access to the interior of said drum and to said agitator of said automatic washing machine, a service unit, said service unit being a one-piece plastic insert having a depressed central portion surrounded by rising side portions, said side portions having a flared edge extending away therefrom with its bottom surface positioned on said housing contiguous to the loading opening to support said service unit, the central portion of said insert having an aperture therein loosely receiving the agitator of said automatic washing machine, and said side portions being positioned against the surfaces of said drum and said housing.

2. The combination of claim 1 in which said edges of said housing and said drum defining said loading opening each include a downturned portion, said downturned portions being positioned against the outer surfaces of said side portions of the service unit.

3. The combination of claim 1 in which said side portions have a contour that is complementary to the contour of the inner surfaces of said downturned portions of said edges.

4. The combination of claim 1 in which said service unit is formed of styrene.

References Cited by the Examiner

UNITED STATES PATENTS 2,794,546  6/1957  Miller.
3,187,887  6/1965  Charles et al. _____ 206—46

THERON E. CONDON, *Primary Examiner.*

MARTHA L. RICE, *Examiner.*